United States Patent [19]

Goldsmith

[11] 4,323,763

[45] Apr. 6, 1982

[54] PARAMETRIC POWER CONTROLLER

[75] Inventor: Jeff M. Goldsmith, Medford, Mass.

[73] Assignee: GCA Corporation, Bedford, Mass.

[21] Appl. No.: 38,646

[22] Filed: May 14, 1979

[51] Int. Cl.³ .............................................. H05B 1/02
[52] U.S. Cl. ................................... 219/497; 219/501; 219/494; 236/15 BF; 373/77
[58] Field of Search ............... 219/497, 492, 494, 501, 219/507, 508; 236/15 B, 46; 13/12; 307/310, 235 R

[56] References Cited

U.S. PATENT DOCUMENTS

| 3,184,686 | 5/1965 | Stanton ............................. 236/15 B |
| 3,428,250 | 2/1969 | Holthausen ....................... 236/15 B |
| 3,786,161 | 1/1974 | Sartorius .................................. 13/12 |
| 3,819,960 | 6/1974 | Kohn et al. .......................... 219/494 |
| 3,901,437 | 8/1975 | Harkins ............................. 236/15 B |
| 4,114,024 | 9/1978 | Donner ................................. 219/489 |

OTHER PUBLICATIONS

"Microprocessors in Action", Hermance et al., Electronics, 11/23/1978, pp. 150-153.

Primary Examiner—B. A. Reynolds
Assistant Examiner—Mark H. Paschall
Attorney, Agent, or Firm—Kenway & Jenney

[57] ABSTRACT

Disclosed is a vacuum furnace temperature controller for the stable regulation of temperature over a wide range of temperatures. The control loop includes a multiplier responsive to the desired temperature which modifies the overall loop gain and the maximum power which may be applied to the furnace heater as a function of the desired temperature.

8 Claims, 3 Drawing Figures

PARAMETRIC POWER CONTROLLER

BACKGROUND OF THE INVENTION

This invention relates to apparatus for automatic temperature control and more particularly to such apparatus for the accurate and smooth control of temperature in vacuum furnaces over a wide range of operating temperatures.

Vacuum furnaces are often employed for batch sintering processes such as the sintering of carbides. To insure high quality products, the rate at which the furnace heats up must be carefully controlled because even small temperature variations from a desired profile can seriously degrade the quality of the finished sintered product. In the past it has been difficult to control smoothly and accurately the temperature profile in vacuum furnaces over wide temperature ranges because the heat transfer characteristics vary with temperature. Specifically, in a vacuum furnace heat transfer between the furnace chamber and the load is substantially by radiation alone; convection and conduction heat transfer mechanisms are precluded by the vacuum condition. At high temperatures, heat transfer among the furnace heating elements, the load and the temperature sensor by radiation is very efficient allowing for tight temperature control. This is so because heat transfer by the radiation mechanism is proportional to the fourth power of temperature. At low temperatures, on the other hand, control problems are caused by the thermal lags present in a vacuum system. These lags result in part from changes with temperature of radiant heat transfer, heat loss, heating element resistance, heat penetration into the load and thermodynamic properties of the load.

At low temperatures these thermal lags can result in unacceptable temperature regulation, namely, an oscillation of the furnace temperature about the desired temperature set point. In particular, as soon as the set point from a programmer exceeds the furnace chamber temperature, the controller calls for full power, thereby heating the furnace at its maximum rate. Although the power to the furnace will be reduced to zero when the chamber temperature reaches the set point, the thermal inertias inherent in the system can cause the temperature to overshoot the set point substantially. The furnace eventually will cool to meet the rising set point again causing full power to be applied. A cyclic pattern is thus established which will persist until a temperature is reached for which the control parameters and power level are more nearly appropriate. And even if stabilization were achieved, variations in the process characteristics with changing low temperatures may cause the controller to lose stability.

The prior art has attempted to deal with these control difficulties at low furnace temperatures by providing essentially two sets of control laws—one set for low temperatures and another set for high temperatures. That is, one set of controller gains and a maximum power level would be selected for low temperatures and another set of gains and maximum power for high temperatures. These prior art attempted solutions, however, have not proved successful; the abrupt switchover from one set of control laws to another set could not provide the sought after smooth heat up curve at low temperatures.

It is an object of the present invention, therefore, to provide temperature control apparatus which permits smooth and accurate temperature regulation over a wide range of desired temperatures.

It is a further object to provide such apparatus which is more flexible, affords a smoother operation and is of lower cost than previously known.

SUMMARY OF THE INVENTION

The furnace temperature controller according to the present invention for accomplishing the foregoing objects comprises a programmer for providing a set point signal representing the desired furnace temperature and temperature sensing means responsive to the furnace temperature for providing a feedback signal representing this furnace temperature. The furnace is heated by a power controller which varies the heating power applied to the furnace as a function of a control signal applied to it. A means responsive to the set point signal and the feedback signal is provided for generating an error signal which varies as a function of the difference between the furnace temperature and the desired temperature but which has a predetermined maximum value equal to the level of the power controller control signal corresponding to the maximum power available from the power controller. A multiplier responsive to the set point signal and the error signal is disposed in the control loop to provide to the power controller a control signal having a range which varies as a function of the set point signal thereby to limit as a function of the desired temperature the heating power which can be applied to the furnace.

In a preferred embodiment the multiplier is disposed in the control loop so as both to reduce selectively the overall loop gain and to limit the maximum power available to the furnace from the power controller.

In another preferred embodiment, signal conditioning means responsive to the set point signal are provided for generating an output signal having a limited range, this output signal comprising one input to the multiplier thereby to reduce the overall loop gain and to limit the maximum heating power available to the furnace.

BRIEF DESCRIPTION OF THE DRAWING

The invention disclosed herein will be made clearer with reference to the following drawing of which.

DESCRIPTION OF THE PREFERRED EMBODIMENT

Figure 1:
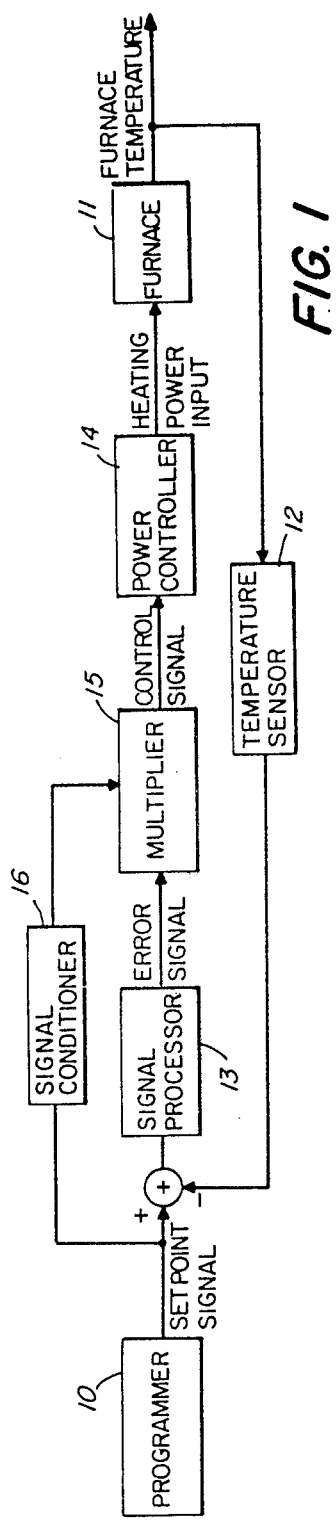
FIG. 1 is a block diagram representation of the present invention.

With reference first to FIG. 1, a programmer 10 generates a set point signal representing the desired temperature profile within a sintering furnace 1. The furnace 11 is preferably a vacuum furnace for sintering carbides, for example. A temperature sensor represented by the block 12, preferably a thermocouple junction, is disposed within the furnace 11 near the load to be sintered. The output of the sensor 12, representing the temperature within the furnace 11 is subtracted from the set point signal from the programmer 10. This difference is then introduced into a signal processor 13 to produce an error signal.

The signal processor 13 operates on the difference input to produce an error signal having a predetermined maximum value. This maximum value is selected to be equal to the level of the control signal input to a power controller 14 corresponding to the maximum heating power available to furnace 11 as an output from the power controller 14. That is, no matter how large the input to the signal processor 13 may be, its output, the error signal, is bounded. For small level inputs to the signal processor 13, a linear control law is preferred. For example, the signal processor 13 may operate on its input to produce an error signal which is the sum of a first term proportional to the input, a second term proportional to the time rate of change of the input and a third term proportional to the time integral of the input. The three proportionality constants are chosen by conventional linear control system synthesis techniques to provide for tight temperature regulation at high temperatures, e.g., above 800° C.

Because the dynamics of the overall temperature regulation system of FIG. 1 change as a function of temperature, the maximum value of the output of the signal processor 13 and the linear proportionality constants are not suited for close, stable regulation at low temperatures, e.g., below 600° C. As discussed hereinbefore, the thermal lags arising from poor heat transfer at low temperatures because of the vacuum within the furnace 11 result in oscillatory behavior of furnace temperature. In accordance with the practice of the present invention, a multiplier 15 is disposed within the control loop to modify the error signal coming from signal processor 13.

The multiplier 15 has two inputs: the error signal from the signal processor 13 and the output from a signal conditioner 16. The input to the signal conditioner 16 is the set point signal from the programmer 10. The signal conditioner 16 operates on the set point signal to produce an output signal which is essentially proportional to the desired temperature. The signal conditioner 16 also scales its input so that its output varies over a limited range having a minimum value greater than zero. That is, even at very low temperatures, the output of the signal conditioner 16 will be above zero. This characteristic of the signal conditioner 16 is extremely important for heating the furnace from a low starting temperature. This is so because the control signal output of the multiplier 15 is the product of the error signal and the output of signal conditioner 16. If the output of signal conditioner 16 were allowed to become arbitrarily small at low starting temperatures, the control signal from the multiplier 15 would be correspondingly small thereby precluding the application of sufficient heating power to begin heating the furnace 11. The details of the signal conditioner 16 will be discussed below in conjunction with FIG. 2. It is preferred that the ratio of the maximum value to the minimum value of the limited range output of signal conditioner 16 be on the order of ten.

The multiplier 15 thus modifies the error signal as a function of the desired furnace temperature. Specifically, at low temperatures the overall control loop gain and the maximum heating power available to the furnace 11 are reduced allowing smooth and stable temperature regulation. At very high temperatures, on the other hand, the multiplier 15 passes the error signal virtually unchanged.

As indicated previously, it is contemplated by the present invention that one input to the multiplier be controlled as a function of the desired or set point temperature over at least a portion of its range. In the preferred embodiment illustrated, both end points of the range are adjustable as is the proportionality constant within the range. These adjustments are provided by the signal conditioner 16 which is illustrated in greater detail in FIG. 2.

The signal representing the desired temperature, i.e., the set point signal, is applied by a buffer amplifier A1, through a scanning resistor R3 to the inverting input of an amplifier A2. The inverting input terminal of this latter amplifier constitutes a summing junction through which the various control signals are applied, as explained hereinafter. The noninverting input of amplifier A2 is grounded. The gain of amplifier A2 is adjustable by means of feedback resistance R7. This adjustment allows setting of the proportionality constant of the transfer function within the proportional range of the system.

The output of amplifier A2 is presented from going negative with respect to ground by means of an amplifier A3. Any incipient negative voltage at the output of amplifier A2 causes amplifier A3 to forward-bias the diode D1 and thereby apply a counteracting current to the inverting input of amplifier A2.

The positive swing of the output signal from amplifier A2 is also limited, this limitation being provided by the amplifier A4. A positive reference potential is applied to the inverting input of amplifier A4 by means of the potentiometer R9. Any incipient excursion of the output signal of amplifier A2 beyond this reference potential causes the output signal of amplifier A4 to forward-bias the diode D2 and apply a counteracting current to the inverting input of amplifier A2. It can thus be seen that the output signal from amplifier A2 is constrained between ground and a positive voltage preselected by potentiometer R9 and, between these limits, gain is preselectable by adjustment of the resistance R7.

The output voltage from amplifier A2 is applied through a scaling resistor R17 to the inverting input of an output amplifier A5. Amplifier A5 is operating in an inverting mode with negative feedback being provided by a resistor R19. A slowing or filtering action is provided by a capacitor C1. Additionally, a preselectable negative bias is applied to the inverting input through a resistor R18.

In that amplifier A5 operates in an inverting mode, it can be seen that maximum output from amplifier A5 is obtained when the output of amplifier A2 is at zero or ground potential. The desired temperature to which this maximum gain corresponds can be adjusted by means of potentiometer R5. This potentiometer fixes the nominal d.c. bias at the input of amplifier A2. This adjustment thus determines the "break point", the point at which maximum or full power is obtainable from the heating system. At lower desired temperatures, the output signal from the amplifier A2 and thus also that from the amplifier A5 will vary in proportion to the set point signal, the proportionality being determined by the setting of resistance R7. The resistance R7 thus provides a "slope" adjustment. The lower limit for the output signal from amplifier A5 is set by means of potentiometer R9 which establishes the maximum voltage at the output of amplifier A2. This minimum output level determines the minimum availability of heating power and minimum loop gain which is effective at lower set point temperatures.

Figure 2:
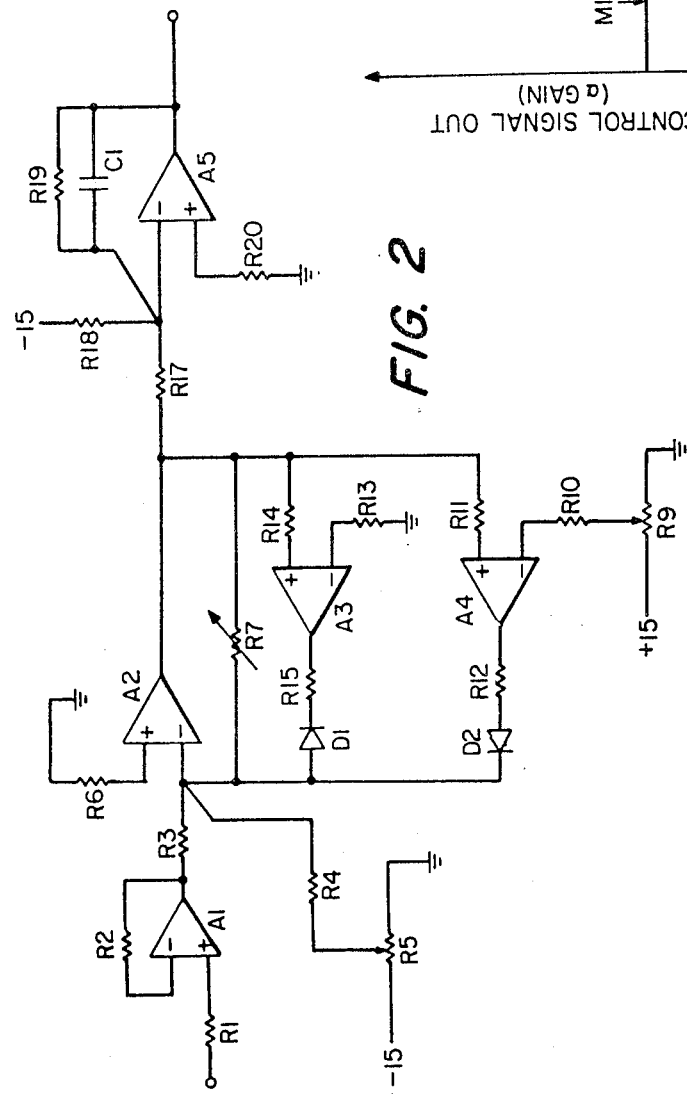
FIG. 2 is a schematic diagram of the signal conditioner of FIG. 1.
Figure 3:
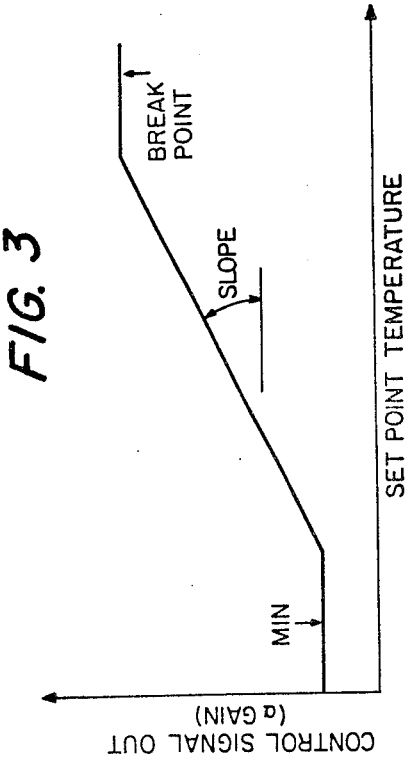
FIG. 3 is a graph of control signal output versus set point temperature.

The overall transfer function of the circuitry of FIG. 2 is illustrated in FIG. 3. In this diagram, the curve representing the transfer function is labeled to show the characteristics which can be independently altered by the different adjustments provided in the FIG. 2 circuitry. In particular, the potentiometer R5 permits adjustment of the "break point" or the lowest temperature for the maximum value of output signal; potentiometer R9 permits adjustment of the "minimum" signal out; while the variable resistance R7 permits adjustment of the "slope" between these values.

Since the control signal out is applied as one of the input signals to the multiplier, it can be seen that both the loop gain and the maximum power available for temperature correction are also varied in correspondence with this transfer function. In other words, less power and less loop gain is available at lower set point temperatures, there being a minimum level for each so that control is not lost during initial heating.

It is thus seen that the objects and advantages of the present invention have been met in that there has been disclosed a vacuum furnace temperature controller which provides for smooth and stable regulation both at low and high temperatures automatically.

It is recognized that modifications and variations of the present invention will occur to those skilled in the art and it is to be understood that such modifications and variations are within the scope of the appended claims:

What is claimed is:

1. A furnace temperature controller comprising:

a programmer providing a set point signal representing a desired temperature;

temperature sensing means responsive to the furnace temperature for providing a feedback signal representing said furnace temperature;

power controller means for varying the heating power applied to the furnace as a function of a control signal applied to said power controller means;

means responsive to said set point signal and said feedback signal for generating an error signal which varies as a function of the difference between the furnace temperature and the desired temperature but which has a predetermined maximum value equal to the level of control signal corresponding to the maximum power available from said power controller means; and a multiplier responsive to said set point signal and said error signal for providing to said power controller means a control signal having a range which varies as a function of said set point signal thereby to limit the heating power which can be applied to said furnace.

2. The controller of claim 1 wherein said multiplier is disposed for reducing the overall loop gain and limiting the maximum heating power available to said furnace.

3. The controller of claim 1 further comprising signal conditioning means responsive to said set point signal for generating an output signal of limited range, said output signal comprising one input of said multiplier thereby to reduce the overall loop gain and to limit the maximum heating power available to said furnace.

4. The controller of claim 3 wherein said limited range has a minimum value greater than zero.

5. The controller of claim 3 wherein the ratio of the maximum value to the minimum value of said limited range is 10.

6. The controller of claim 1 wherein said temperature sensing means comprises a thermocouple junction disposed within said furnace.

7. The controller of claim 1 wherein said furnace is a vacuum furnace adapted for sintering operations.

8. A furnace temperature controller comprising:

a programmer providing a set point signal representing a desired temperature;

temperature sensing means responsive to the furnace temperature for providing a feedback signal representing said furnace temperature;

power controller means for varying the heating power applied to the furnace as a function of a control signal applied to said power controller means;

means responsive to said set point signal and said feedback signal for generating an error signal which varies as a function of the difference between the furnace temperature and the desired temperature but which has a predetermined maximum value equal to the level of control signal corresponding to the maximum power available from said power controller means;

signal conditioning means responsive to said set point signal for generating an output signal having a limited range; and means for generating the product of said error signal and said output signal, said product forming the control signal input to said power controller means, said control signal thereby having a range which is limited as a function of said set point signal thereby to limit the heating power which can be applied to said furnace as a function of the then desired temperature.

* * * * *